Figures 1A, 1B:
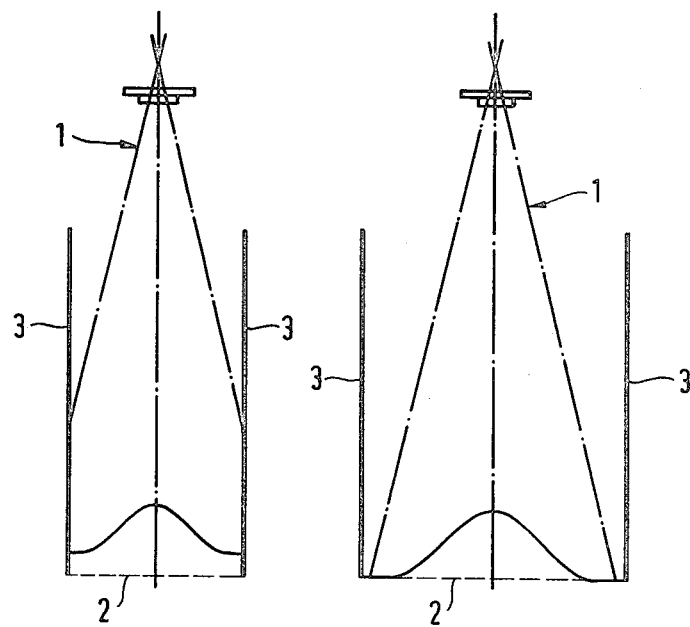

United States Patent [19]

Battigelli et al.

[11] Patent Number: 4,478,624

[45] Date of Patent: Oct. 23, 1984

[54] PROCESS AND APPARATUS FOR IMPROVING THE DISTRIBUTION ON A RECEIVING DEVICE OF FIBERS CARRIED BY A GAS CURRENT

[75] Inventors: Jean A. Battigelli, Rantigny; Dominique Plantard, Paris, both of France

[73] Assignee: Isover Saint-Gobain, Paris, France

[21] Appl. No.: 404,328

[22] Filed: Aug. 2, 1982

[30] Foreign Application Priority Data

Aug. 6, 1981 [FR] France ................................. 81 15282

[51] Int. Cl.³ ............................................. C03B 37/06
[52] U.S. Cl. ........................................... 65/4.4; 65/5; 65/6; 65/9; 65/14; 65/16; 156/62.4; 425/7; 425/8
[58] Field of Search ...................... 65/5, 6, 14, 16, 4.4, 65/9; 156/62.4; 425/7, 8

[56] References Cited

U.S. PATENT DOCUMENTS

| | | | |
|---|---|---|---|
| 3,215,514 | 11/1965 | Levecque et al. | 65/14 X |
| 3,233,990 | 2/1966 | Stephens et al. | 65/14 X |
| 3,295,943 | 1/1967 | Mabru | 65/9 X |
| 3,785,791 | 1/1974 | Perry | 65/16 X |
| 3,787,194 | 1/1974 | Rayle et al. | 65/14 X |
| 4,263,033 | 4/1981 | Michalek | 65/4 R |
| 4,300,931 | 11/1981 | Phillips | 65/14 X |

FOREIGN PATENT DOCUMENTS 232809  6/1967  U.S.S.R. ................................. 65/16

Primary Examiner—Robert Lindsay
Attorney, Agent, or Firm—John T. Synnestvedt; Kenneth P. Synnestvedt

[57] ABSTRACT

The invention relates to the distribution on a receiving device of fibers carried by a gas current.

To improve the distribution, the gas current carrying the fibers is subjected to the action of a gas layer which envelopes the current and of which the direction of flow in a plane tangent to the gas current differs from that of the gas current. The action of the gas layer results in an expansion of the current carrying the fibers.

The invention is particularly useful where the fibers are received on a collecting device such as a foraminous conveyor belt, of large width.

14 Claims, 14 Drawing Figures

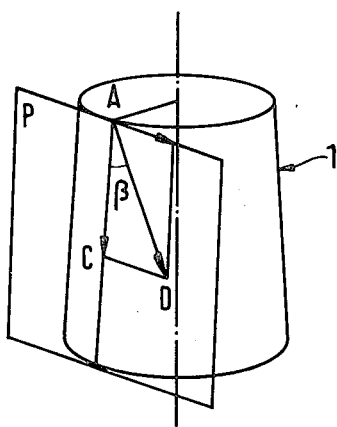
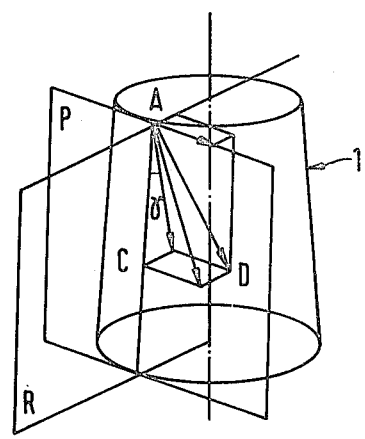
Fig. 2a    Fig. 2b
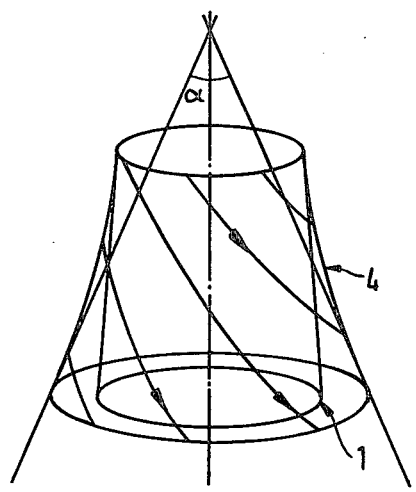
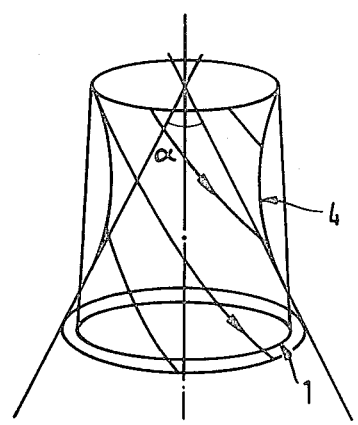
Fig. 3a    Fig. 3b

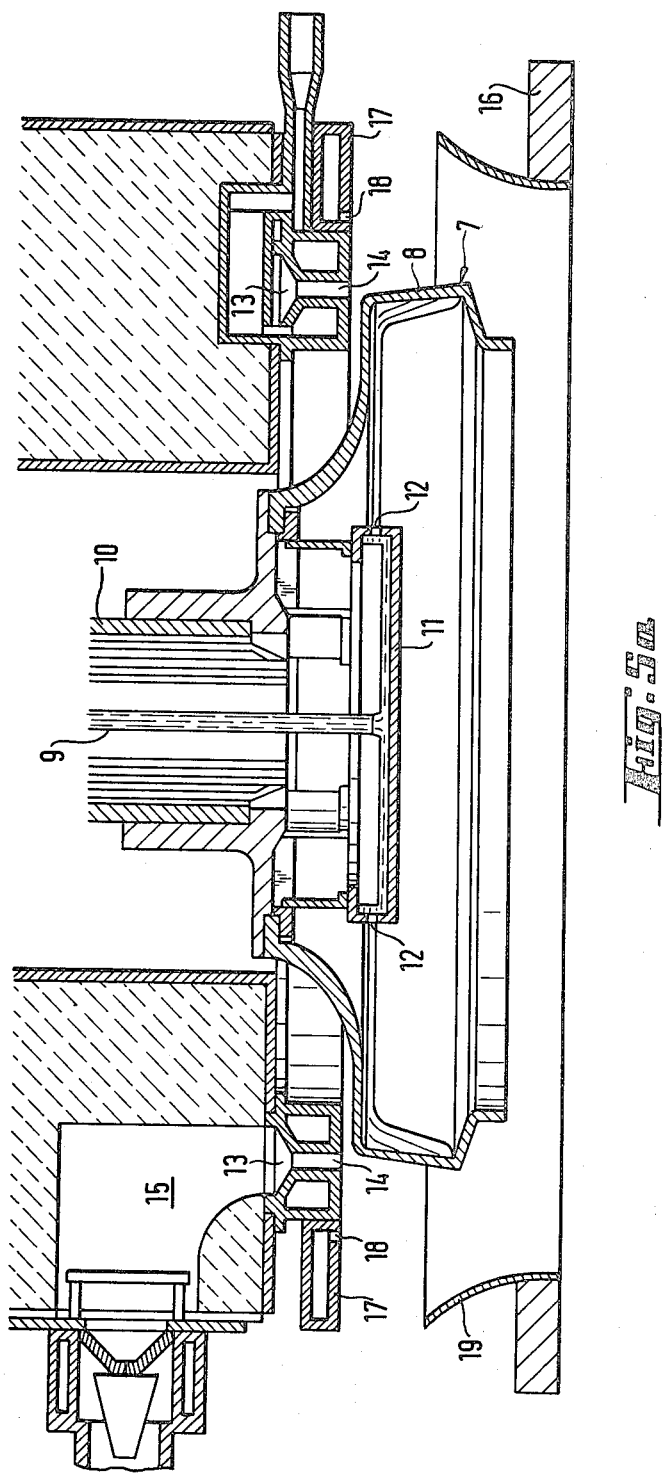

PROCESS AND APPARATUS FOR IMPROVING THE DISTRIBUTION ON A RECEIVING DEVICE OF FIBERS CARRIED BY A GAS CURRENT

The invention relates to the deposit of fibers, carried by gas currents, on a receiving device. In particular, these fibers are mineral fibers, such as glass fibers or the like, carried by the gas currents used during their formation and which are gathered on a collecting device to form mats, blankets or similar products.

By reason of its importance, particular reference is made to the area of the production of mineral fiber mats. Nevertheless, the invention is applicable to all types of fibers transported by gas currents to a receiving device such as a foraminous conveyor on the surface of which it is desirable to have good distribution.

A uniform distribution is necessary so that the fiber mats, or similar products, possess good mechanical, as well as insulating, properties.

Normally the formation of the fibers immediately precedes that of the mats. The gases commonly used for attenuation of the fibers also serve for the transport of the fibers, so that the characteristics of the gas currents implemented are mainly governed by the conditions fixed for the fiber formation operation.

The fiber distribution on the receiving device or element is closely related to the geometric characteristics of the installation and to the character of the gas current.

In the following explanation the gas currents are presented as if their character structure and especially their dimensioned limits were precisely determinable. Obviously this is only a convenient simplification to illustrate the phenomena which develop. A gas current which is freely delivered into the ambient atmosphere undergoes a profound transformation. It carries along or induces the ambient air with which it is in contact, and its volume has a tendency to be increased. Simultaneously a portion of its initial energy is transferred to the induced air and the velocity decreases. These two changes are more substantial at the periphery than at the heart of the current.

It is also verified through experimentation that the fibers carried from the start are not uniformly distributed. In the current which is growing larger, the fibers are more abundant at the center than at the periphery. Besides, the velocity of the current is greater at the center. For these reasons the deposit of fibers is more significant on the portion of the receiving element located in the path of the heart of the current.

In other respects, the first apparatus from which the fibers are issued is ordinarily of relatively small size in relation to that of the chamber in which the fibers are delivered and especially in relation to the device on which the fibers are collected. Similarly the gas current which carries the fibers to the collecting device, is also of relatively small size in relation to the collected device, which accentuates the difficulty in obtaining a uniform distribution of the fibers.

In effect the gas current traverses the foraminous receiving device, which retains the fibers; this device normally comprises a conveyor belt. The passage of the gas through this receiving device determines the fiber distribution. When the current covers only a portion of the receiving surface, the fibers are essentially concentrated in the trajectory of the gas, leaving the remainder of the surface covered with few fibers or practically not at all.

Since the dimensions of the receiving device are, of necessity governed by that of the product being produced, as well as by considerations relating to the production rates of the installation, it is necessary to find means resulting in a satisfactory distribution of the fibers on even relatively large surfaces.

One solution proposed to resolve this distribution problem consists of piping the gas current carrying the fibers by means of a mobile conduit animated by a to-and-fro movement. The gas current is thus directed so as to sweep the whole surface of the receiving element. Complicated mechanisms vary the direction and speed of displacement of the mobile conduit.

Due to the complexity of the mechanical system and to the resultant lack of reliability, it is preferable to avoid having to resort to this type of apparatus as much as possible.

Another solution proposed consists of delivering isolated jets transversely to the path of the current carrying the fibers to compensate certain systematic unbalances observed, for example one side of the surface of the receiving element receiving more fibers than the opposite side. The use of jets was also contemplated to impart the to-and-fro movement to the fiber carrying current, formerly obtained by mechanical means. This procedure avoids resorting to mechanical elements but is not free of disadvantages. In the first place, if it is relatively easy to change the form of the gas current, it is more difficult to obtain a uniform distribution corresponding to this deformation. In the second place, the change in flow by the impact of jets distributed intermittently creates undesirable turbulence. This turbulence can, for example, give rise to the formation of rovings which unfavorably influence the quality of the finished product.

One object of the invention is to improve the fiber distribution on the fiber collecting device, and consequently the characteristics of the finished product.

Another object of the invention is to provide means to facilitate this improvement, and especially means to change the flow of the gas current carrying the fibers without encountering the disadvantages of the prior art.

The studies which have resulted in the invention have shown that it is possible to change the normal flow of the gas current carrying the fibers, particularly the transverse dimensions of this current, by the enveloping of this gas current by a gas layer of suitable characteristics. This gas layer is produced so that on at least one part of its course it travels tangentially along the gas current being changed. In addition, in the region where the layer is tangent to the gas current, the direction of the flow of the gas layer is different from that of the gas current. If the direction of the flow of the layer is projected in the plane tangent to the gas current, the component of this direction is distinct from the direction of flow of the current. In other words, in the tangent plane, the paths routes of the respective directions of the gas current and of the gas layer form between them a certain angle (which will be designated hereafter by $\beta$).

More vividly, the gas layer which envelopes the gas current carrying the fibers is "rolled" around this gas current. It is animated by a movement which, in a certain way, corresponds to a rotation around the gas current.

The process according to the invention is applicable to gas currents of various forms. In practice the most common currents have a substantially circular cross-section.

In the following description these circular currents will be considered more particularly, it being understood that this in no way excludes currents of which the cross-section would be presented in another form, which would lend itself to the establishment of a tangential gas envelope such as indicated above.

The form of the gas current being considered here is that which appears at the level where it comes in contact with the gas layer which envelopes it. This form is not necessarily the same as at the start, that is, in the fiber forming zone. Thus for certain formation processes the gas current is emitted from an orifice having an elongated rectangular cross-section. At contact with the ambient air, a rapid change in the initial form of the gas current is established. After a relatively short distance, a flow is reconstructed in which the cross-section is practically circular.

This type of transformation is independent of the initial form of the gas current which is delivered freely into the atmosphere. It can be put to advantage when the initial form of the gas current adapts itself with difficulty to the contact with a gas layer under the conditions required by the invention.

The progression at the level where the current presents this somewhat circular cross-section facilitates the implementation of the gas layer.

The characteristics of the currents having a circular cross-section are also changed during their progression, as stated above. They have a tendency to spread out in a cone-like shape upon contact with the surrounding atmosphere. Under the normal conditions, this expansion is relatively slow. The opening angle of the cone is small (on the order of 20°).

For a current having a circular transverse cross-section, the tangent layer, according to the invention, appears at the origin in the form of a hyperboloid having a rotation around an axis which coincides with that of the gas current.

In progressing it is understood that the gas layer also changes shape by its contact, on the one hand, with the gas current that it changes and, on the other hand, with the ambient atmosphere.

In operating as was just indicated according to the invention, a combined gas current is obtained which expands more rapidly than the initial current. In other words, the opening angle of the cone is increased in such a way that, without modifying the respective positions of the fiber forming apparatus and the receiving element, it becomes possible for the entire fiber receiving surface to be uniformly traversed by the gas current.

The complexity of the mechanism of interaction between the current and the gas layer does not lend itself to a perfect analysis. Two phenomena can serve as models to explain the action of the gas layer:

The partly rotatory movement of the gases of the layer creates a sort of vortex. The zone situated at the interior of the layer is depressed in relation to the layer itself. The gas current which is conducted in this zone has a tendancy to fill up this depression and is therefore found "aspirated" toward the layer forming an envelope.

In addition, the gas layer favors the induction of a movement following its own direction in the gas current with which it is in contact. The tangential component of the movement of the layer is partly transferred to the current. A movement of the gas toward the exterior by centrifugal force is developed at the heart of the current.

Each of these phenomena only partially accounts for the mechanism of the movement of the gas. In practice, only a combination of inseparable effects can be ascertained. Whatever the mechanism, the result is the increase of the expansion angle of the gas current as is shown in the implementation examples indicated below.

The choice of conditions for implementing the invention is closely related to the gas current carrying the fibers as well as the characteristics of the installation. The best conditions therefore must be determined in each case, taking into account the considerations stated hereafter.

The amplitude of the modification of the gas current obtained according to the invention depends on numerous factors.

It is understood that an important primary element for changing the gas current is the geometry of the gas layer which envelopes it. It was observed that in the tangent plane the direction of flow of the layer presented a component dissimilar to that of the gas current. In this plane, the angle between the two directions can vary to a relatively large degree.

Because of the initial flow of the current, the direction of the layer cannot be even partially countercurrent to the current. In other words, the angle between the directions of the current and of the layer, still in the tangent plane, cannot exceed 90°. In fact, an angle too close to 90° would be manifested by a very localized effect; the gas of the envelope deviating very much from the current would have little effect on the latter.

Similarly, a very small angle between these directions would be manifested by a very limited effect. The gas layer would envelope the current, but would not change its trajectory substantially.

In practice, so that the layer fully envelopes the current and at the same time confers to it a certain movement, it is preferable that the angle between the directions be comprised between 5° and 60° (on both sides) and more particularly between 10° and 45°.

In considering the geometry of the gas flow at the level where the layer comes in contact with the current, reference is made above to the component of the direction of flow of the layer in the plane tangent to the gas current carrying the fibers. However, this direction is not necessarily entirely in the tangent plane. In certain cases it can be advantageous to also give it a radial component in the plane transverse to the flow of the gas current.

For a radial component directed toward the interior of the current, the gas layer first becomes contracted, then is expanded again following a course, as before, which is a function of the angle of the direction of flow of the layer in relation to the direction of the current in the tangent plane. The initial contraction of the current under the effect of the layer does not prevent the increase of the expansion angle of the current. This increase is only pushed further downstream.

The presence of this radial component can be particularly useful when, independent of the question of fiber distribution on the fiber collecting device, it appears preferable not to increase the cross-section of the gas current too soon. For example, it can concern preventing certain parts of the equipment from meeting with the trajectory of the gas current. It can also be preferable to contract the gas current in order to proceed to a treating operating, such as subjection to a liquid spray.

Forming a contraction of the passage of the current must not disturb the general characteristics of the gas current. In other words, this effect must be relatively limited, or as an equivalent, the radial component of the direction of the gas layer must be low in relation to the other components, failing which the gas layer over-accentuatedly conducted to the interior of the current would create turbulences disorganizing the normal flow.

The relative measurement of the radial component in the plane containing the contact point of the layer with the current and the axis of the current, is expressed by the angle of this axis and of the projection of the direction of flow of the layer. This angle which will be designated by $\gamma$ is preferably not greater than 20° when the radial component is conducted toward the interior of the current.

Most frequently, the radial component as indicated above is directed toward the interior of the current. However, it can be directed toward the exterior. In this case a 45° angle constitutes a limit which is preferably not exceeded.

The form of the gas layer envelopping the current is not the only factor which determines the change of the current carrying the fibers. The amplitude of this change is also related to the quantities of movement or impulses of the current and the gas layer respectively.

So that the effect of the gas layer on the current is significant, the impulsion or energy of the layer must be of an order of magnitude comparable with that of the current where the action is developed. A layer having too weak an impulse would leave the current practically unchanged. Conversely, it is not necessary or even desirable to use a layer with too great kinetic energy or impulse, the increase of the production cost of this gas layer not necessarily being accompanied by an additional improvement of the result.

The impulse expression is:

$$I=\rho \cdot v^2 \cdot S$$

$\rho$ being the volumetric mass of the gas flow considered, v its velocity and S its right section. It appears advantageous for the implementation of the invention to maintain the relation of the impulse of the layer $I_S$ to that of the current $I_B$ in the limits:

$$0.5 \leq I_S/I_B \leq 2$$

These values are given for the preferred case, i.e. where the gas layer is emitted in immediate proximity to the gas current carrying the fibers. If the gas layer is generated at a distance from the current, the $I_S/I_B$ relation can be increased in significant proportions. Therefore, the influence of the ambient air on the layer must be considered. The farther the emission point of the layer is spaced from the current, the more significant is the degree to which impulse is dissipated by contact with the ambient air. To obtain the same effect on the current the initial impulse of the layer must be increased with greater spacing.

One advantage of the process for modifying fiber distribution according to the invention is that it is instantaneously possible to change the parameters implemented to account for irregularities occurring in the conditions for forming fiber mats. By varying the pressure in the apparatus emitting the gas layer, the speed, and consequently the impulse of the layer, is varied.

By previous tests, the modification of the gas current can be determined for each pressure condition, as will be seen in the examples of the invention.

The localization of the gas layer, or more precisely that of its action on the gas current, depends essentially on the structure of the current and on the influence of this structure on the fibers.

As above mentioned it is advantageous for this action to take place at a point where the current has a circular cross-section. It should also be noted that it is preferable to have a current in which the flow is well defined, which necessitates that the action of the layer takes place at a moderate distance from the delivery point of the gas current. Similarly, because that the modification of the gas current obtained according to the invention results in the enlargement of the opening angle of the current, if this enlargement is to be effective at the level of the fiber collecting device, it is necessary that the modification be effected at a sufficient distance from the collecting device.

In general, if at the start the fibers are uniformly dispersed in the gas current, substantial deceleration of the gas current which it undergoes before reaching the receiving element and the resulting turbulence, tend to impair the uniformity of the fiber dispersion. It is preferable to modify the gas current according to the invention before the impairment in uniformity occurs.

A particularly important consideration from the industrial viewpoint can illustrate the role of the structure of the current on the fibers and, consequently, show the reasons for the preferred placement of the gas layer. This consideration concerns processes in which the formation of the fibers is conducted by means of a centrifugation drum or spinner which also serves as a bushing. In this type of process the fiber attenuation is completed by having gas blown transversely of the projection of the fibers from the spinner. The blowing is effected annularly at the periphery of the spinner in the immediate vicinity thereof.

The progression of the gas current from the origin is as follows. A slight reduction in size of the gas current is formed just below the spinner in consequence of the induction of ambient gas in this zone by the annular gas current. Due to this reduction in diameter, the gas current comes together (and contracts) below the drum and then spreads out again like the conical currents discussed above. In addition to these changes in shape, the gas current very clearly undergoes a strong deceleration upon contact with the ambient air.

The fibers form a sort of continuous veil entrained by the current. The retarding and the contracting below the spinner cause folding and rupturing of the veil. The ruptures extensively impair the distribution of the fibers, or groups of fibers, and impair the homogeneity of the fibers in the gas current beyond a certain distance from the forming element.

For this reason it is preferable to effect the change of the current according to the invention before the irregularities in fiber distribution in the current are noticeably developed. This substantially requires having the action of the gas layer take place preferably before the contracting zone of the current which occurs below the spinner.

In all cases the gas layer effects a transformation of the flow of the current carrying the fibers without affecting the fibers. Its action intervenes at a moment when the fibers are no longer in the attenuable state. Given the rapid cooling of very fine fibers, the gas blowing forming the layer can take place relatively close to the fiber forming zone.

For the same reasons, the blown gas is at a lower temperature than that for melting the material constituting the fibers. Advantageously, the gas is approximately at room temperature.

Obviously, the nature of the blown gas can be very diverse. Ordinarily, for reasons of convenience, either air or water vapor are used, however, other gases or gas mixtures can be used as well.

The invention also concerns apparatus for implementing the process described above. A typical installation includes a foraminous fiber collecting device traversed by a gas current and retaining the fibers carried by this current by additional gas supply placed above this collecting device in the path of the current and generating a gas layer enveloping the current before the current reaches the collecting device.

These means are equipped with orifices from which the gas layer is emitted. The orifices are placed around the current and are directed in such a way that the layer presents the characteristics above described. In particular, the direction of the emission orifices in the plane tangent to the periphery of the gas current at the point of contact with the latter is different from the direction of the flow of the current.

In the preferred case, the current having a circular cross-section, it is advantageous to generate the gas layer from a ring-shaped blower surrounding the current.

The gas layer and, consequently, the blower are preferably as close as possible to the gas current without forming an obstacle in the path of the latter. Under these conditions, it can be considered that the blower is in a tangent position in relation to the gas current. The angle of the direction of the emission orifices of the gas layer with the axis of the blower is therefore preferably comprised between 10° and 60°.

As was stated above, with respect to the direction of the flow of the layer, the direction of the orifices can also have a radial component. The presence of the radial component is especially advantageous when the annular blower is slightly removed from the periphery of the current or when the blower is placed at a point where the current tends to become contracted for the reasons seen above.

If the effect of the gas layer can be modified by varying the pressure of the gas in the blower, it is also possible to a certain extent to instantaneously change the direction of the flow of the gas layer. The theoretically possible mechanical adjustability of the blower is somewhat undesirable due to the complexity and the lack of reliability which would result therefrom.

To change the flow direction, it is advantageous to place side by side two annular blowers of which the gas delivery directions are different from one another. The orifices of these two blowers are close enough to each other so that the gas jets unite rapidly. A combined gas layer is thus formed of which the characteristics, and especially the direction, depend on the characteristics of each of the blowers.

For example, one of the blowers can have orifices of which the direction is that of the current, while the direction of the orifices of the other orifices is inclined in relation to the direction of the current. The energy or impulse (regulated by the pressure) of each of the two blowers determines the direction of the flow of the combined layer.

The apparatus according to the invention, just described, enables the direction of the flow of the layer to be instantaneously changed, without structural modification. As for the variations in pressure applied to the single blowers, the fiber distribution can thus be corrected as a function of a permanently effected measure realized on the prepared product. It is also possible to subject the functioning of the apparatus to an automatic control element connected to the control instruments of the product.

Figure 4:
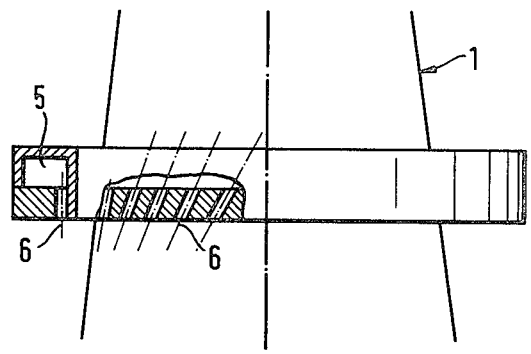
Figure 5A:
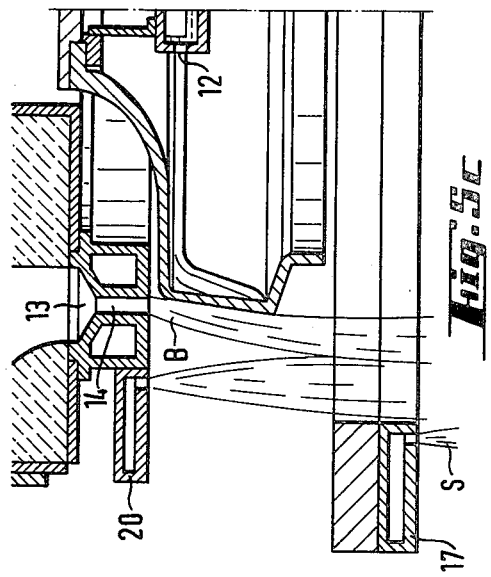
Figure 5B:
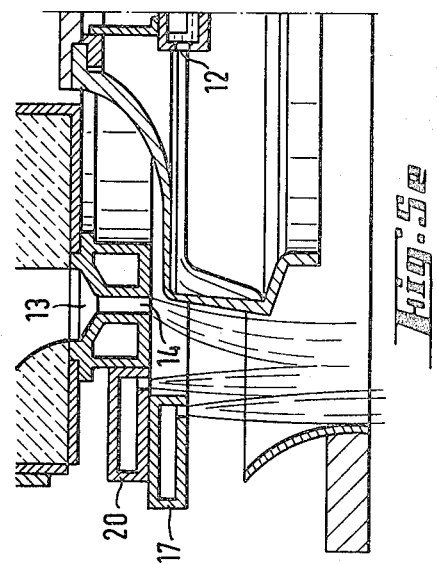
Figure 5C:
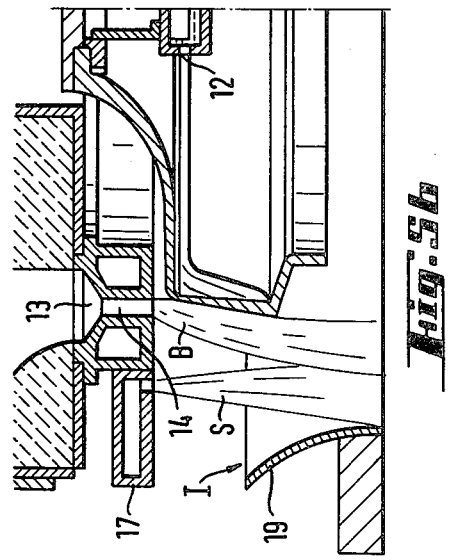
Figure 5D:
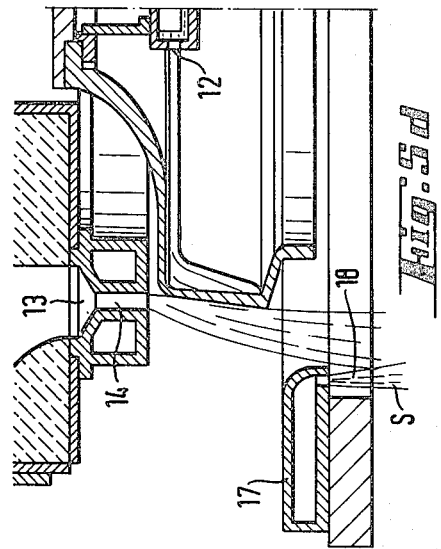
Figure 6:
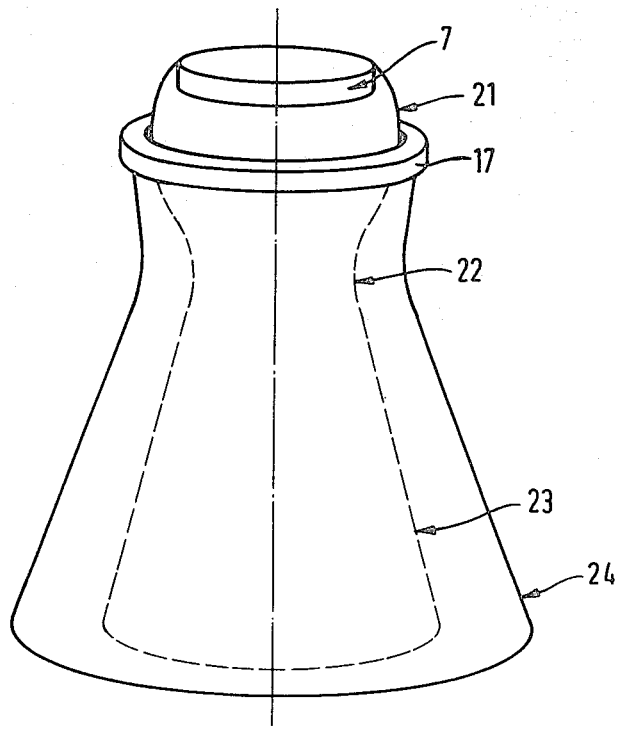
Figure 7:
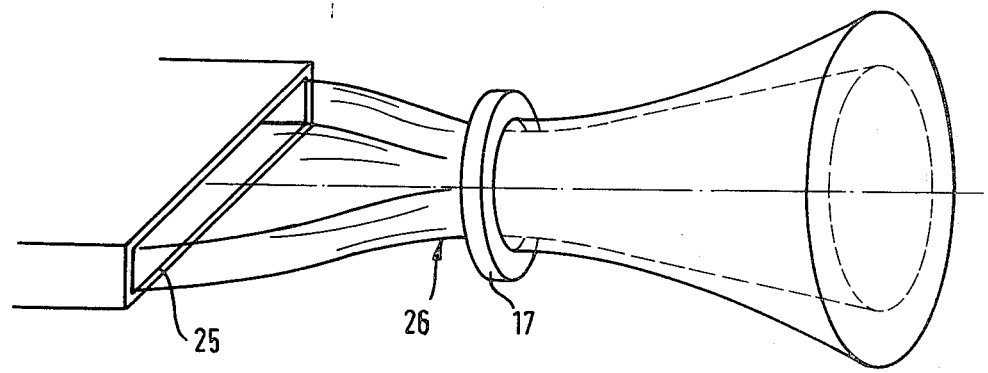

The invention is described in greater detail following the description which refers to the drawings in which:

FIGS. 1a and 1b schematically illustrate fiber distribution in the absence of employment of the invention, FIGS. 2a and 2b schematically represents how the direction of the gas layer is presented with respect to the gas current, FIGS. 3a and 3b schematically represent the form of the gas flow modified according to the invention, FIG. 4 is an elevational view partially in section of a blowing apparatus for forming the gas layer according to the invention, FIG. 5a is a section presenting an adaptation of the blowing apparatus, according to the invention, to an installation for fiber formation by the use of a centrifugation spinner, FIG. 5b is a fragmentary view of a portion of the equipment of FIG. 5a on which the approximate gas flow is represented, FIG. 5d is another partial view of an apparatus of the type shown in FIG. 5a, presenting another position of the blowing apparatus, FIGS. 5c and 5e are two other partial views of installations analogous to that of FIG. 5a, in which a double blowing apparatus is shown, FIG. 6 is a schematic view in perspective of a centrifuge unit for fiber formation, equipped with a blower according to the invention, showing the influence of the latter on the trajectory of the gas current, FIG. 7 is a schematic representation showing the deformation of a gas current, rectangular at the start, upon contact with the ambient air, and with the action of a blower according to the invention.

FIGS. 1a and 1b illustrate an example of fiber distribution on a receiving element when the latter is relatively large in relation to the gas current carrying the fibers.

Gas current 1 is schematized by a representation of what can be considered as its boundaries. In fact, if at the start these boundaries are relatively well defined, they are a lot less free in proportion as they progress toward the fiber collecting device 2. The approximate boundaries shown are those in which the gas current carries on the order of 95% of the fiber produced. It is ascertained that the distribution of the fibers in the absence of modification of the current is effected in a flow path of bell-shaped profile.

This distribution is modified more or less as the gas current presents a cross-section larger or smaller in relation to the dimensions of the receiving surface. In the cases shown, current 1 remains identical and the sizes of the chamber and the receiving element are changed.

The structure of the layer modifying the flow of the gas current carrying the fibers is detailed in FIGS. 2a and 2b.

These figures present in perspective a gas current 1 of conical shape. The gas layer at a point A of contact with the current is determined by its direction of flow D.

For the case shown in FIG. 2a the direction D is entirely in the plane P tangent to the gas current at point A. The direction D is characterized by the angle $\beta$ which it forms with the direction of flow C of the gas current at point A.

In FIG. 2b the direction of flow of the layer at point A also has a radial component. This component is located in the plane R orthogonal to the plane P passing through the axis of the current. The measurement of the angle $\gamma$ of the projection of D on plane R, with a direction of current C, characterizes the radial component of direction D.

These figures present direction D at point A from the periphery of the current. The direction from such a point is that which is obtained by rotation of the figure around the axis of the current.

In these FIGS. 2a and 2b, direction C of the flow of the current is represented along a generatrice of the cone constituting the circumference of the gas current. In practice, certain modifications of this direction can be established. In particular, in the processes implementing a rotating element, the direction of flow can form an angle (which ordinarily does not exceed a few degrees) with the generatrices of the cone. The indications given below which relate to the direction of flow nevertheless remain applicable.

The form of the flow 4 resulting from the action of the gas layer according to the invention is schematized in FIGS. 3a and 3b which correspond respectively to the cases in FIGS. 2a and 2b, that is, without radial component and with a radial component directed toward the interior of the current.

In the two cases, the flow of current 1 in the absence of the gas layer is shown with fine lines and the flow 4 formed by the combination of the layer and the current is shown with heavy lines.

The angle $\alpha$ indicates the enlargement of the gas current. As has already been indicated, without the modification introduced according to the invention, the enlargement is relatively small (on the order of 20°). In the two cases shown, the angle $\alpha$ for the combined flow is substantially increased, even if, in the case of FIG. 2b, the current first undergoes a contraction.

The production of the gas layer according to the invention can be obtained by means of an apparatus of the type shown in FIG. 4. This apparatus, intended for modifying a current having a circular cross-section, is ring-shaped. It surrounds the gas current 1 as closely as possible without disturbing it.

It is formed by a blowing crown comprising an annular chamber 5 conducting a pressurized gas. The means for gas supply are not shown. This gas escapes through a series of orifices 6 placed at the base of the chamber and on the entire periphery of the latter. The orifices 6 are at a constant inclination in relation to the axis of the apparatus. Their direction has no radial component in this figure.

The orifices 6 are close enough together so that the individual jets, due to their expansion, flow together in the form of a practically continuous layer along the gas current 1.

The blowing crown represented comprises only one series of orifices 6; obviously, it is possible to arrange several series of concentric orifices at the same or at varying levels.

In FIG. 4 the orifices are constituted by grooves formed in the edge of the piece forming the base of the chamber 5. The grooves are closed laterally by the piece forming the inside cover of chamber.

Other arrangements providing the desired flow direction can be used. One arrangement consists of emitting a gas layer through a continuous slit, the direction of the flow being assured, for example, by means of sloped fins placed at regular intervals in this slit on the path of the gas layer.

Several devices of the type shown in FIG. 4 can be used simultaneously to combine their effects. In this case the apparatus, and more precisely their respective emission orifices, are preferably arranged close enough together to unite the various gas layers formed.

FIG. 5a shows a method of implementing the invention in connection with a spinner for forming fibers by centrifugation.

The device shown was described in detail in French patent application No. 2,459,783 and also in U.S. Pat. No. 4,203,745.

This device comprises a centrifuge or spinner designated in its entirety by reference 7. This centrifuge has a peripheral 8, with small orifices (not shown) through which the fiberizable material is delivered in small streams.

The fiberizable material 9 is supplied through a hollow shaft 10. It falls into a distribution basket 11 rotating with the spinner, and from which the material is projected through the orifices 12 to the interior peripheral wall 8 of the centrifuge.

The filaments (not shown) which become detached from the wall 8 by centrifugal force are subjected to a transverse gas current originating from an annular chamber 13 equipped with an annular nozzle 14. The chamber 13 is supplied by one or more combustion chambers 15.

The combustion gases in this apparatus constitute a gas current which pass downwardly over the periphery 8 of the centrifuge and carrying along the fibers while completing their attenuation.

To heat the lower portion of the centrifuge, a high frequency induction ring 16 is placed concentric to the centrifuge and at a distance sufficient to leave free the trajectory of the gas current carrying the fibers.

In certain prior embodiments an additional blowing apparatus is added. This ring-shaped apparatus is concentric to the entire centrifuge 7 and to the nozzle of the burner 14. It directs gas jets parallel to the axis of the centrifuge, that is, parallel to the gas current emitted by the burner. The essential role of this blower is to canalize the fibers which would be sent through the gas current of the burner to avoid being dispersed in the surrounding atmosphere. The supplementary blowing also limits the expansion of the gas current issuing from the burner and therefore facilitates the passage of the current through induction heater 16 within the defined limits.

According to one embodiment of the invention, a blower 17 includes orifices located substantially at the same level as the nozzle 14 and at a distance from the latter. This distance is several times the width of the nozzle 14, so that the convergence of the gas layer S emitted by the annular blower 17 and of the gas current B originating from nozzle 14 occurs at the level of the lower extremity of the centrifuge 7 or even beyond as shown in FIG. 5b.

The fibers carried along by the current B are thus already formed at the level where the layer S modifies the flow of the current B.

The combination of the layer S, the current B and also the induced gases I (represented by an arrow indicating their general direction) passes through the inductor ring 16. To prevent the formation of vortexes a conformer 19, intended to canalize the different gas flows, is placed on this ring.

In FIG. 5c, the blower 17 is placed this time under the inductor ring 16. The layer S and the current B then converge practically from the exit from the blower.

FIG. 5d shows another variation in which the blower is placed on the inductor ring. The portion of the blower 17 exposed to the gas current is extended and takes the place of a conformer to prevent the formation of turbulence. Of course, it is possible to combine this position of the blower by placing a conformer in the same way as above.

FIG. 5e shows a unit analogous to that of FIGS. 5a or 5b in which two concentric blowers are used simultaneously. The blowers are placed so that their respective orifices are very close together. As a result, the jets emanating from the two blowers unite very rapidly to form a single layer before the point of convergence with the current B.

The tangential component of the direction of the layer S enveloping the current B is conferred as above by the blower 17 of which the orifices are sloped in relation to the axis of the centrifuge, whereas the orifices of the blower 20 are directed, for example, parallel to the axis of the apparatus.

As we have seen, the position of the blower creating the layer in relation to the gas current can vary to a fairly large extent. For reasons already given, it is preferable that it be located upstream of the contraction which uniformly appears on the gas current implemented in the apparatus of the type shown in FIGS. 5a to 5e.

FIG. 6 shows in perspective the general aspect of the gas flow for this type of apparatus. The characteristic form in the absence of the gas layer is partially indicated by a dotted line.

Three levels are clearly distinguished in this flow. Near the centrifuge apparatus the current forms a sort of bulb 21. Next, it is contracted around and below the centrifuge 7, as indicated at 22, then expanded again in a conical flow 23.

The blower 17 generating the gas layer is preferably located upstream of the zone 22 where the current is of the minimum width.

The modified flow 24 combining the layer and the current is shown with solid lines.

FIG. 7 schematically illustrates the transformation undergone by an initially rectangular current upon contact with the ambient air. The gas emitted from the rectangular orifice 25 rapidly comes together to take the form which enables the easiest distribution in the ambient air, that is, a flow having a circular cross-section. After the gathering achieved at 26, the flow becomes conical as before. For this type of current it is advantageous to place the blower generating the tangential layer at a point on the path of the current close to the gathering point 26.

The case in FIG. 7 is the extreme. For orifices of less oblong shape, the reconstitution of a flow having a practically circular cross-section is very rapid and it is possible to place an annular blower very early on the path of the gas current.

The purpose of the following examples is to show to which types of results the implementation of the invention leads. These examples obviously have no restrictive characteristic.

EXAMPLE 1

Tests were conducted to determine the action of the gas envelope according to the invention on the shape of a gas current carrying the fibers.

The modified gas current is that formed by a fiber producing device analogous to the one shown in FIG. 5a. At the level of the blowing crown the gas current is about 340 mm in diameter.

At the start, the total impulse of this current is on the order of 70N.

The opening angle of the current in the absence of a blower is about $\alpha=20°$.

The blowing crown is arranged as shown in FIG. 5*a*. It has a series of orifices arranged on a circle of 380 mm in diameter. The total opening surface of these orifices is $5\times10^{-4}m^2$.

The axis of each orifice of the blower forms an angle with the general axis of the apparatus of $\beta=30°$.

The angle $\alpha$ measuring the opening of the current with the fibers is determined for a series of air compressions from the blower.

The results are the following:

| | | | | | |
|---|---|---|---|---|---|
| Pressure in $10^5$Pa | 0 | 0.45 | 1.05 | 1.4 | 1.8 |
| Impulse N | 0 | 29 | 58 | 74.5 | 94 |
| Opening angle $\alpha$ | 20° | 25° | 33° | 38° | 42° |

These tests show that by increasing the pressure and therefore the impulse of gas from the blower, the degree of expansion of the current carrying the fibers is substantially changed.

EXAMPLE 2

Tests were conducted as in Example 1, however, this time varying the angle $\beta$ of the blowing direction in relation to the direction of the flow of the gas current.

The apparatus and the operating conditions of the burner are unchanged. The gas current is therefore identical.

The dimensions of the blower are also the same as in Example 1. The pressure in the blower in all the tests is $1.4\times10^5$Pa.

The modification of the gas current, expressed by the measurement of the angle $\gamma$ as a function of several gradients $\beta$ of the blower jets, is indicated in the following table.

| | | | | |
|---|---|---|---|---|
| $\beta°$ | 10 | 20 | 30 | 45 |
| $\delta°$ | 28 | 34 | 38 | 45 |

In the field considered, it has been ascertained that the opening angle $\gamma$ increases in the same way as that of the direction of the jets with the direction of the flow of the current.

As was stated above, the angle $\beta$ is preferably maintained within certain limits. Even if it is possible to entrain more significant modifications by increasing the angle $\beta$ the final result on the flow of the gas current and the fiber distribution is not necessarily advantageous. By increasing the angle β too much, the normal flow of the gas current can be disturbed, and in addition, a very large angle α is not always necessary to obtain good distribution.

In this regard, it should be noted that increasing the angle α of the gas current is intended to improve the fiber distribution on the receiving element, especially when the latter is relatively wide. For each installation, and for each configuration of the gas current to be modified, (this particularly includes the distance separating the origin of the current and the receiving element as well as the dimensions of this element), prior tests should be conducted to determine the amplitude necessary for the modification of the current carried out according to the invention.

EXAMPLE 3

The process according to the invention is implemented on an installation for the production of fiber mats.

The fiber forming apparatus is, as described above, of the centrifuge type. It is located 3.75 m from the conveyor belt on which the fiber mats are formed. The conveyor is 2 m wide.

The centrifuge, being 300 mm in diameter, issues 14 tons of material per day.

The burner issues a gas current under the conditions indicated in Example 1.

A test is conducted without the use of the blower. The fiber distribution on the mats shows a great lack of uniformity. The contour is bell-shaped as shown in FIG. 1b.

The variations of fiber weight in the mats, as a function of the receiving point considered, shows, in relation to the average value, relative differences of ±80%, depending on whether it is located at the center or on the edges of the belt.

A similar test is conducted, this time making use of the blower. The characteristics of this blower are those indicated in Example 1, with a pressure of $1.4 \times 10^5$ Pa.

The distribution on the conveyor belt is substantially improved. The relative differences, in relation to the average value, of fiber weight in the transversal direction does not exceed 7.5%. These additional variations are not reproduced systematically in the space. Their localization varies according to the specimen considered. In an ordinary production line, several fiber forming apparatus are aligned above the same conveyor belt. The variations corresponding to each of the fiber "layers" statistically have a tendency to compensate for each other, so well that the differences noted on the final product are again substantially reduced.

In this way, fiber mats are thus obtained having, in every aspect, highly uniform mechanical as well as thermal qualities. These results are obtained by implementing the methods of the invention alone. It is of course possible to combine these methods with other previously known methods, such as those which were indicated at the beginning of this description.

We claim:

1. A process for producing mineral fiber mats on a perforated fiber-collecting surface, comprising attenuating streams of molten mineral material in an attenuating zone in a gas current, directing said current with the attenuated fibers toward the fiber-collecting surface, and developing a layer of gas surrounding and adjoining the periphery of the fiber-carrying current and directing said layer into contact with the gas current, the contact being effected in spaced relation downstream of said attenuating zone, the general direction of flow of the gas of said layer being toward the collecting surface and at any peripheral position around the current being at an oblique angle to the adjoining portion of the fiber-carrying gas current.

2. A process according to claim 1 further characterized in that the direction of flow of the gas of said layer has a component directed radially of the gas current.

3. A process according to claim 2 in which the radially directed component lies in the angular range from about 20° inwardly to about 45° outwardly with respect to the axis of the gas current.

4. A process according to claim 3 in which the radially directed component is directed radially inwardly.

5. The process according to claim 1 characterized in that the gas current carrying the fibers has a substantially circular cross-section and that the gas layer which envelopes it has an annular concentric cross-section.

6. A process according to claim 1 characterized in that the relation of the kenitic energy of the gas layer $I_S$ to that of the modified current $I_B$ is such that $0.5 \leq I_S/I_B \leq 2$.

7. A process according to claim 1 characterized in that the gas layer is delivered from a series of individual jets.

8. A process according to claim 1 characterized in that the direction of flow of the gas layer in the plane tangent to the current at any peripheral position forms an angle with the direction of the flow of the current between about 10° and 60°.

9. The process according to claim 1 characterized in that the gas layer is formed from air at room temperature.

10. A process according to claim 1 characterized in that the gas layer is formed from two coaxial layers having flow paths each forming a different angle with the direction of the flow of the gas current.

11. Apparatus for producing mineral fiber mats on a perforated fiber-collecting surface, comprising means for attenuating streams of molten mineral material in an attenuating zone in a gas current, means for directing said current with the attenuated fibers toward the fiber-collecting surface, blowing means for developing a layer of gas surrounding and adjoining the periphery of the fiber-carrying current, and means for directing said layer into contact with the gas current downstream of said attenuating zone, the general direction of flow of the gas of said layer being toward the collecting surface and the flowing means including means circumferentially positioned around the current and arranged to deliver gas at an oblique angle to the adjoining peripheral portion of the fiber-carrying gas current.

12. Apparatus according to claim 11 characterized in that the means developing the gas layer comprises a blowing manifold surrounding the gas current and having orifices the axis of each of which forms an angle between 10° and 60° with respect to the direction of the flow of the gas current.

13. Apparatus according to claim 11 characterized in that the flowing means comprises two concentric blowing manifolds having emission orifices with axes in different angular positions with respect to the gas current.

14. Apparatus according to claim 11 in which the means for developing the fiber-carrying gas current comprises a fiber attenuating centrifuge apparatus having a perforated rotor and also having a blower delivering a current having a region of reduced diameter downstream of the rotor, and further in which the means for developing the gas layer is positioned along the path of the attenuating current downstream of the periphery of the rotor but upstream of the zone in which the attenuating current reaches its minimum diameter.

* * * * *